United States Patent Office 3,255,179
Patented June 7, 1966

3,255,179
METHYL PENTAACETYLTHIOLINCOSAMINIDE
William Schroeder, Pavilion Township, Kalamazoo County, Mich., assignor to The Upjohn Company, Kalamazoo, Mich., a corporation of Delaware
No Drawing. Filed Apr. 13, 1964, Ser. No. 359,490
1 Claim. (Cl. 260—210)

This invention relates to a novel compound and is particularly concerned with methyl pentaacetylthiolincosaminide [methyl 6-acetamido-2,3,4,7-tetra-O-acetyl-6,8-dideoxy-1-thio-D-erythro-D-galacto-octopyranoside], and a method for the preparation thereof.

The novel compound of this invention and the process for the production thereof can be illustratively represented in the following manner:

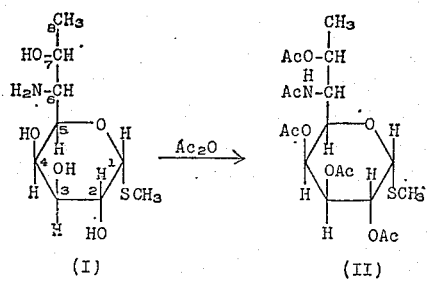

wherein Ac signifies the acetyl group.

The process of the present invention comprises: acetylating methyl thiolincosaminide (I) with an excess of acetic anhydride to obtain methyl pentacetylthiolincosaminide (II).

The novel compound, methyl pentaacetylthiolincosaminide, is an important intermediate in the production of antimicrobially active substances. For example, it can be converted to 2,3,4,7-tetra-O-acetyl-6-acetamido-6,8-dideoxy-D-erythro-D-galactoaldehydo-octose 2,4-dinitrophenylhydrazone (III), which has the following structural formula:

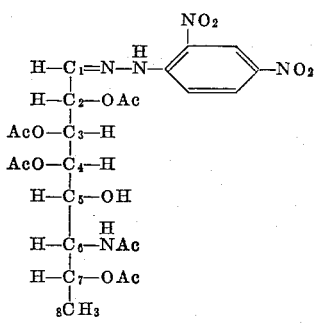

(III)

Compound III is prepared by hydrolyzing methyl pentaacetylthiolincosaminide (II) with hydrochloric acid in acetic acid at reflux temperature to the aldehyde form of pentaacetyllincosamine which is thereafter reacted with dinitrophenylhydrazine to give the 2,4-dinitrophenylhydrazone of structure III. The novel compound III is an active antibacterial and antifungal agent having activity against *Alternaria solani*, Fusarium, *Aspergillus flavus*, *Candida albicans*, Corynebacteria, and the like. This antimicrobial activity can be utilized for washing equipment in microbiological laboratories, washing instruments as well as clothing in hospitals and in laboratories specializing in the cultivation of microorganisms. Also, in such locations where sterile backgrounds are necessary, floors, walls and ceilings can be washed with aqueous solutions of this compound.

The compound III can also be used in sprays against plant pathogens, for example to protect tomato plants against *Alternaria solani*.

The starting material, methyl thiolincosaminide, is a novel material, produced as shown in the preparations.

In carrying out the process of the present invention, methyl thiolincosaminide, suspended in a solvent such as pyridine, is reacted with acetic anhydride or acetyl chloride. Instead of pyridine other diluents can be used, such as dioxane, tetrahydrofuran, or the like. In the event that acetyl chloride or acetyl bromide is used, a hydrogen halide acceptor, such as pyridine or triethylamine, should also be used. The reaction is carried out at temperatures between 0° and the reflux temperature of he mixture, with temperatures between 15 and 75° C. preferred. The reaction at high temperatures generally proceeds faster and at temperatures between 50 and 75° C. is complete in a period of less than 1 hour. After the reaction is terminated, the methyl pentaacetylthiolincosaminide is isolated by conventional means, generally by adding water and collecting the crystals which form. If necessary, excess reagent and solvent can be removed by distillation at low pressure and the residue can be recrystallized.

The following preparation and example are illustrative of the process and products of the present invention but are not to be construed as limiting.

PREPARATION *Methyl thiolincosaminide*

A solution of 4 g. of lincomycin [U.S. Patent 3,086,912] in 20 ml. of hydrazine hydrate (98–100%) was refluxed for 21 hours; excess hydrazine hydrate was then removed in vacuo under nitrogen at steam bath temperature. The residue, a pasty mass of crystals, was cooled, acetonitrile was added, and the mixture was stirred until the crystals were suspended. The crystals were collected, washed with acetonitrile and with ether. The yield of white, crystalline methyl thiolincosaminide after drying in vacuo at room temperature was 2.1 g. (84%). Recrystallization was accomplished by dissolving the methyl thiolincosaminide in hot dimethylformamide and adding an equal volume of ethylene glycol dimethyl ether.

Methyl thiolincosaminide has a melting point of 225–228° C., an optical rotation of $[\alpha]_D^{25}$ +276° (c.=0.768, water), and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

EXAMPLE 1

*Methyl pentaacetylthiolincosaminide*

To a slurry of 1 g. of methyl thiolincosaminide in 5 ml. of pyridine was added 5 ml. of acetic anhydride. The mixture was warmed until the methyl thiolincosaminide dissolved. After standing at room temperature for ½ hour, the solution was warmed on the steam bath for 15 minutes and then poured into 50 ml. of water. Upon cooling and scratching, crystals deposited which were collected and washed with cold water. After drying in vacuo the yield of methyl pentaacetylthiolincosaminide was 950 mg. Recrystallization from hot water gave pure methyl pentaacetylthiolincosaminide having a double melting point, 211–213° C. and 218–220° C. and rotation $[\alpha]_D^{25}$ +224° (c.=0.708, methylene chloride).

*Analysis.*—Calcd. for $C_{19}H_{29}NO_{10}S$: C, 49.2; H, 6.3; N, 3.1; S, 6.9. Found: C, 48.71; H, 6.52; N, 3.14; S, 6.77.

In the manner given in Example 1, other methyl pentaacylthiolincosaminides can be prepared by reacting methyl thiolincosaminide with other acid anhydrides, e.g., with an anhydride selected from propionic, butyric, valeric, hexanoic, benzoic, phenylacetic, phenylpropionic anhydride and the like. Representative compounds thus prepared include:

Methyl pentapropionylthiolincosaminide,
Methyl pentabutyrylthiolincosaminide,
Methyl pentavalerylthiolincosaminide,
Methyl pentahexanoylthiolincosaminide,
Methyl pentabenzoylthiolincosaminide,
Methyl pentaphenylacetylthiolincosaminide,
Methyl pentaphenylpropionylthiolinicosaminide,
and the like.

I claim:
Methyl pentaacetylthiolincosaminide having the following formula:

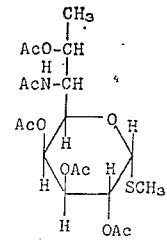

References Cited by the Examiner
OTHER REFERENCES

Pigman, "The Carbohydrates," 1957, pp. 464 and 557–558, Academic Press Inc., New York, N.Y.

Stanek et al., "The Monosaccharides," 1963, pp. 509–510.

LEWIS GOTTS, *Primary Examiner.*

JOHNNIE R. BROWN, *Assistant Examiner.*